US012698879B2

(12) United States Patent
Mügge

(10) Patent No.: US 12,698,879 B2
(45) Date of Patent: Aug. 4, 2026

(54) LIGHTING DEVICE FOR A MOTOR VEHICLE

(71) Applicant: HELLA GMBH & CO. KGAA, Lippstadt (DE)

(72) Inventor: Martin Mügge, Geseke (DE)

(73) Assignee: HELLA GMBH & CO. KGAA, Lippstadt (DE)

( * ) Notice: Subject to any disclaimer, the term of this patent is extended or adjusted under 35 U.S.C. 154(b) by 0 days.

(21) Appl. No.: 18/964,820

(22) Filed: Dec. 2, 2024

(65) Prior Publication Data

US 2025/0180182 A1 Jun. 5, 2025

(30) Foreign Application Priority Data

Dec. 4, 2023 (DE) ........................ 102023133837.4

(51) Int. Cl.
*F21S 43/241* (2018.01)

(52) U.S. Cl.
CPC .................................. *F21S 43/241* (2018.01)

(58) Field of Classification Search
CPC .... F21V 43/239; F21V 43/245; F21V 43/242; F21V 43/241
See application file for complete search history.

(56) References Cited

FOREIGN PATENT DOCUMENTS

DE 20219483 U1 5/2003
DE 102011076621 A1 * 11/2012 ............ F21S 43/237
JP 2023045610 A * 4/2023

OTHER PUBLICATIONS

Innovation Q+ NPL Search (Year: 2026).*

* cited by examiner

*Primary Examiner* — Anabel Ton
(74) *Attorney, Agent, or Firm* — WARNER NORCROSS + JUDD LLP

(57) ABSTRACT

A lighting device for a motor vehicle, comprising at least one light source, a flat light guide, at least one optical component, and a cover disk. The lighting device is designed to be installed in the motor vehicle in such a manner that the normal on the cover disk encloses an angle not equal to 0° with the longitudinal direction of the vehicle. The light guide is arranged in the lighting device in such a manner that the at least one exit surface of the light guide encloses an angle not equal to 0° with the cover disk at least in portions, such that, when installed in the motor vehicle, the normal on at least portions of the at least one exit surface of the light guide forms a smaller angle with the longitudinal direction of the vehicle than the normal on the cover disk.

14 Claims, 4 Drawing Sheets

LIGHTING DEVICE FOR A MOTOR VEHICLE

CROSS-REFERENCE TO RELATED APPLICATIONS

The present application claims the benefit of German Patent Application No. 10-2023-133-837.4, filed Dec. 4, 2023, the disclosure of which is incorporated by reference.

BACKGROUND OF THE INVENTION

Design has long been a determining factor for the signaling functions of a motor vehicle, such as a tail light, a brake light, a direction indicator or a daytime running light, in combination rear lamps or in headlights. The design of these lighting devices has become even more significant since the introduction of LED technology because the small light-emitting diodes, which are often used in larger numbers, can be used much more flexibly than a large incandescent lamp as a light source for a signal function, so that a wide variety of design options are available in conjunction with the selected optical system.

A modification of LED technology is found in the form of OLED technology, in which the light source is not small like a light-emitting diode, but rather has a larger, flat design to form a desired illuminated area that can be illuminated very homogeneously. A disadvantage of OLED technology is the significantly higher cost of OLED technology compared to LED technology. The reasons for these high costs are a complex manufacturing process, the different shapes dictated by the design and small quantities. In addition, there are special, high requirements in the automotive sector, such as resistance to UV exposure and the effects of forces such as vibrations, shocks and shaking, as well as temperature resistance in a region between −40° C. and +85° C. or +100° C. These requirements are substantially more difficult to meet for an organic light-emitting diode than for standard light-emitting diodes.

As a result, alternative options are being sought to achieve a design similar to that of organic light-emitting diodes (OLEDs), in particular a homogeneously illuminated surface. This is achieved by using light-emitting diodes (LEDs) with a flat light guide and upstream optics in the form of micro-structured films or thin optical disks to scatter the light emitted from the light guide. Overall, this provides a flat light module that offers high performance with homogeneous illumination of the entire surface.

Just as with organic light-emitting diodes, several flat light modules can then be positioned next to and behind each other when integrated into a combination rearlight to create the desired individual appearance of the signal function, for example the tail light or tail/stop light.

A lighting device of the type mentioned at the beginning is known from DE 10 2021 122 264 A1. The lighting device described therein comprises a lighting module designed as a flat light module, which has at least one light source, a light guide, a diffusing disk and a luminous surface designed as a cover disk, from which light is emitted during operation of the lighting device. The flat light module also has a housing with a reflective surface.

An exemplary lighting device designed as a flat-light module according to this prior art is shown in FIG. 6 and FIG. 7. This flat light module comprises a light source 1 that has several light-emitting diodes (LEDs). The flat light module also comprises a housing 2 with a front and a rear housing part 2*a*, 2*b*, which are connected to one another by a latching mechanism. A plate-shaped light guide 3 with micro-optics, a white, diffusely reflecting film 4 behind the light guide 3 and two or three micro-optics films 5 in front of the light guide 3 are inserted between the housing parts 2*a*, 2*b*, which together are responsible for the light distribution and efficiency of the system by coordinating the individual micro-optics components. The principle of this basic structure is to provide a light element with a uniform, homogeneously illuminated surface. For this purpose, the lighting device comprises a cover disk 6, which serves as the illuminated exit surface of the lighting device.

The optimum performance of such flat light modules is achieved when the flat light modules are designed and realized parallel to the mains without any rotation or tilting. Small horizontal rotation angles of up to 10° are acceptable due to the light distribution of the system. However, if the design of a headlight or luminaire provides for such FlatLight modules to be positioned with a larger horizontal angle of rotation, this results in a reduction in efficiency because the light distribution of the FlatLight module is twisted according to the specified angle and there is only a reduced light intensity in the forward direction, where the maximum intensity is required by law for a signal function.

This situation is illustrated in FIG. 8 and FIG. 9. FIG. 8 shows a state in which the lighting device is installed in the motor vehicle in such a manner that the normal 7 on the cover disk 6 is parallel to the longitudinal direction 8 of the vehicle. The schematically drawn light distribution 9 shows that the light intensity is maximum in the forward direction.

In the example in FIG. 9, the flat light module is installed in the motor vehicle in such a manner that the normal 7 on the cover disk 6 forms an angle $\alpha$ with the longitudinal direction of the vehicle 8 that is not equal to 0°, for example an angle $\alpha$ of approximately 40°. The schematically drawn light distribution 9 shows that the light intensity in the forward direction is significantly reduced in this installation state.

This means that considerably more power and luminous flux must be fed into the system to compensate for the reduction in performance due to the twisted mounting position. This is often not possible or sensible due to a maximum specified total output or with regard to sustainability and energy efficiency.

SUMMARY OF THE INVENTION

The problem underlying the present invention is therefore the creation of a lighting device of the type mentioned above, in which sufficient light intensity is achieved in the forward direction despite an inclined mounting position of the cover disk, without significantly increasing the power fed into the lighting device. According to the invention, this is achieved by a lighting device with the features discussed herein.

In one embodiment, the lighting device is arranged to be installed in the motor vehicle in such a manner that the normal of the cover disk forms an angle not equal to 0° with the longitudinal direction of the vehicle, and that the light guide is arranged in the lighting device in such a manner, that the at least one exit surface of the light guide encloses an angle not equal to 0° with the cover disk at least in portions, so that in the state installed in the motor vehicle the normal on at least portions of the at least one exit surface of the light guide encloses a smaller angle with the longitudinal direction of the vehicle than the normal on the cover disk. The twisted mounting position of the cover disk desired for design reasons is retained in the design. At the same time, the light guide and any other components of the lighting device are aligned more favorably for the forward-directed light emission.

It may be provided that the lighting device is designed to be installed in the motor vehicle in such a manner that the normal on the cover disk forms an angle of between 10° and 50° with the longitudinal direction of the vehicle, for example an angle of between 20° and 40°. Both the standards on the light guide and, if necessary, the standards on other components of the lighting device can include significantly smaller angles with the longitudinal direction of the vehicle, such as 0° to 20°, for more effective forward light emission.

It is possible that the cover disk is flat or curved and/or that the at least one exit surface of the light guide is flat or curved. Even with a curved cover disk and/or a curved light guide, the normals or the normals on the light guide and, if applicable, the normals on other components of the lighting device can make a smaller angle with the longitudinal direction of the vehicle than the normals or the normals on the cover disk. The radius of curvature of the at least one exit surface of the light guide can be at least partially different from the radius of curvature of the cover disk.

It may be provided that the light guide has a longitudinal direction and a transverse direction perpendicular thereto and a depth perpendicular to the longitudinal direction and to the transverse direction, wherein the light guide has two end surfaces at the ends in the longitudinal direction, two narrow surfaces extending at least partially in the longitudinal direction and two wide surfaces extending in the longitudinal direction. The entry surface of the light guide can be formed on one of the narrow surfaces of the light guide extending in the longitudinal direction and the at least one exit surface of the light guide can be formed on one of the wide surfaces of the light guide extending in the longitudinal direction, wherein in particular an exit surface is formed on each of the two wide surfaces of the light guide extending in the longitudinal direction. It may be provided that the expansion of the light guide in the longitudinal direction is greater than in the transverse direction and the expansion in the transverse direction is greater than in the direction of depth. Alternatively, the expansion of the light guide in the longitudinal direction can be the same as in the transverse direction or smaller than in the transverse direction.

It is possible for the at least one exit surface of the light guide to be curved in the longitudinal direction of the light guide. The radius of curvature of the at least one exit surface of the light guide can change in the longitudinal direction of the light guide. Such a design can also ensure that both the normals on the light guide and, if applicable, the normals on other components of the lighting device make a smaller angle with the longitudinal direction of the vehicle than the normals or the normals on the cover disk.

It may be provided that the light guide has at least one step, preferably a plurality of steps, wherein the steps are spaced apart from one another, in particular in the longitudinal direction of the light guide. In this case, the portions of the at least one exit surface adjoining the at least one step, in particular the portions adjoining each of the steps, can be inclined relative to one another, so that in the state installed in the motor vehicle, the normal on at least a first portion of the at least one exit surface of the light guide forms a smaller angle with the longitudinal direction of the vehicle than the normal on at least a second portion of the at least one exit surface. Thus, at least one portion, preferably a plurality of portions, of the light guide is oriented in such a manner as to ensure effective light emission in the forward direction.

It is possible for the at least one optical component to be designed as a microstructured film and/or as a microstructured optical disk, wherein the at least one microstructured film or the at least one microstructured optical disk is arranged, for example, between the light guide and the cover disk. It is also possible for the at least one optical component to be designed as an at least partially reflective surface, which is arranged on the side of the light guide facing away from the cover disk, wherein the lighting device is set up for this purpose, that light emitted from the exit surface of the light guide facing away from the cover disk strikes the reflective surface, is reflected back from the latter to the exit surface and at least partially re-enters the light guide before it emerges from the exit surface facing the cover disk and passes through the at least one cover disk. In this manner, as with a flat light module, the lighting device can offer high performance by reflecting the light emerging from the light guide at the rear and by targeted scattering on the microstructured films and/or optical disks with homogeneous illumination of the cover disk.

It may be provided that the at least one microstructured film and/or the at least one microstructured optical disk and/or the reflective surface are at least in sections parallel to the at least one exit surface of the light guide. This means that the at least one microstructured optical disk and/or the reflective surface are oriented in the longitudinal direction of the vehicle like the light guide, so that effective light emission in the forward direction is ensured.

It is possible for the lighting device to have a plurality of light sources which are designed as light-emitting diodes and are arranged on a circuit board, in particular a common circuit board, preferably wherein the light-emitting diodes are arranged next to one another in the longitudinal direction of the light guide.

BRIEF DESCRIPTION OF THE DRAWINGS

The invention is explained in more detail in the attached drawings. In the figures.

In the figures, identical or functionally identical parts are marked with the same reference symbols.

DETAILED DESCRIPTION OF THE CURRENT EMBODIMENTS

Figure 1:
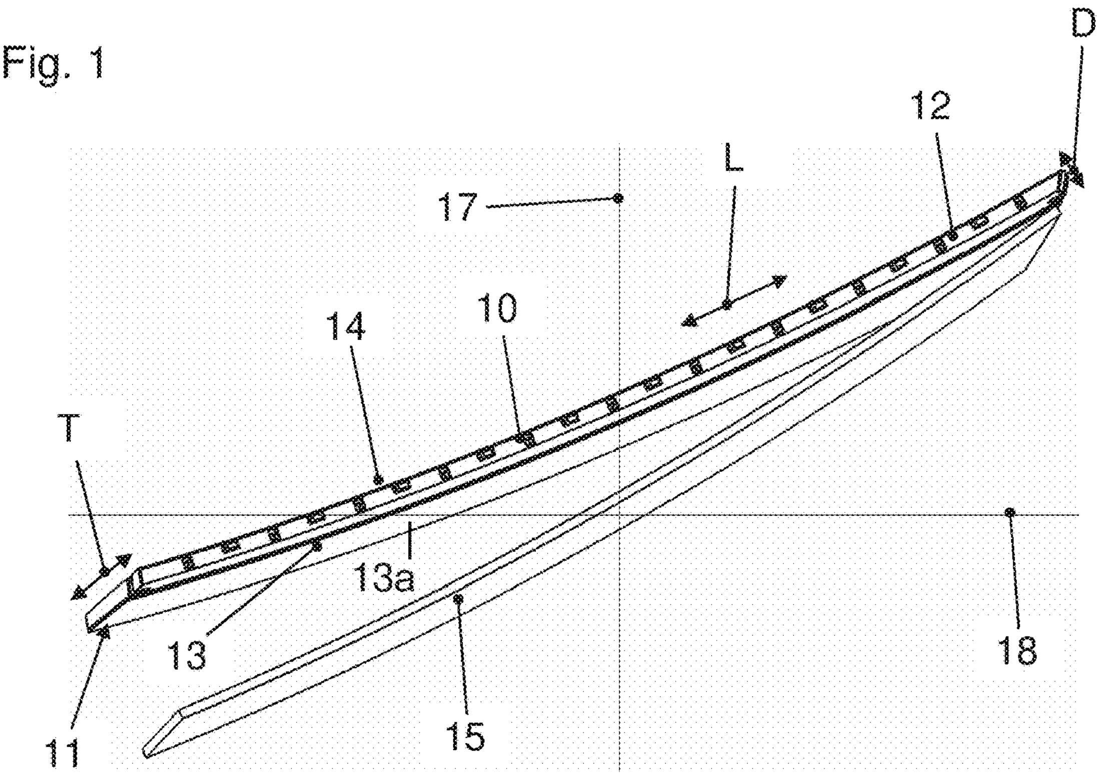
FIG. 1 shows a perspective view of the light guide and the cover disk of a first embodiment of a lighting device according to the invention.

The lighting device shown in the figures comprises several light sources in the form of light-emitting diodes (LEDs). FIG. 1 shows a circuit board 10 on which the light sources in the form of light-emitting diodes are arranged. The multiple light-emitting diodes can also have different colors, for example to implement a double function or a triple function. These functions can be, for example, a position light, a daytime running light and a direction indicator or a position light, a daytime running light and an autonomous driving function, wherein the autonomous driving function requires a cyan color.

The lighting device further comprises a planar light guide 11, which has a longitudinal direction L and a transverse direction T perpendicular thereto, as well as a depth D perpendicular to the longitudinal direction L and to the transverse direction T (see FIG. 1). The extension of the light guide 11 in the longitudinal direction L is greater than in the transverse direction T and the extension in the transverse direction T is greater than in the direction of the depth D. This results in two end surfaces at the ends in the longitudinal direction L, two narrow surfaces extending at least partially in the longitudinal direction L and two wide surfaces of the light guide 11 extending in the longitudinal direction L.

The light guide 11 has an entry surface 12 as well as a first and a second exit surface 13, 14 (see FIG. 1). One of the narrow surfaces of the light guide 11 extending in the longitudinal direction L of the light guide 11 serves as the entry surface 12. Furthermore, the two wide surfaces of the light guide 11 extending in the longitudinal direction L serve as exit surfaces 13, 14 arranged at the front and rear of the light guide 1.

Figure 7:
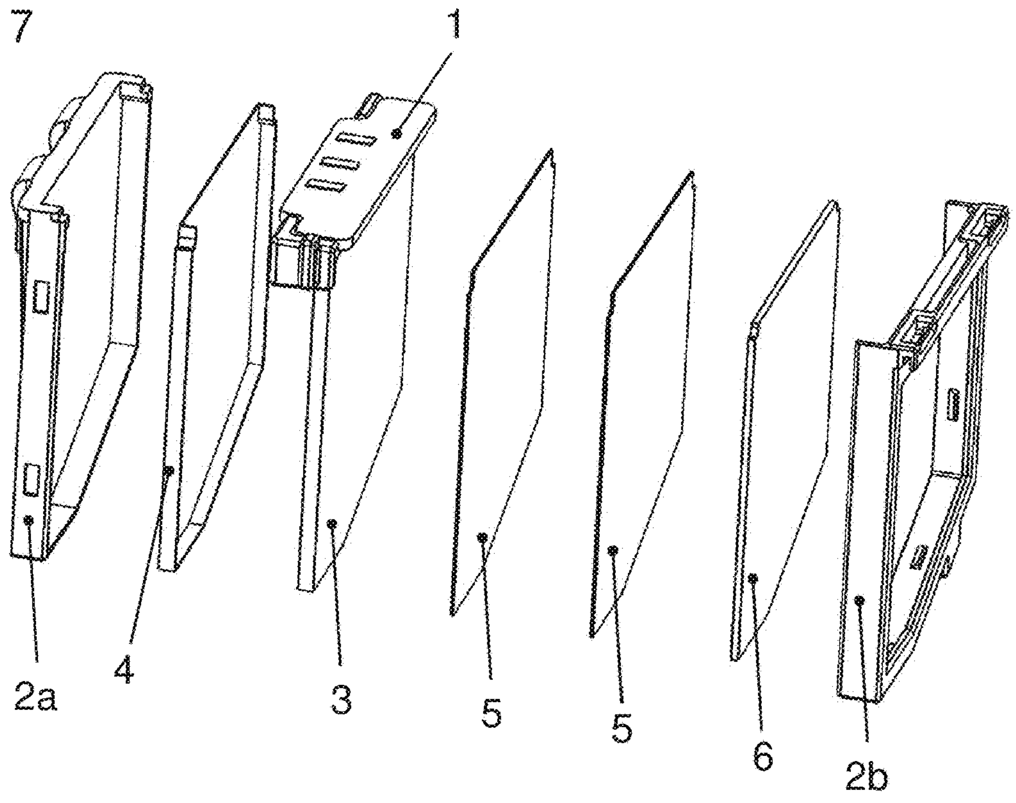
FIG. 7 shows an exploded view of the lighting device according to FIG. 6.
Figure 8:
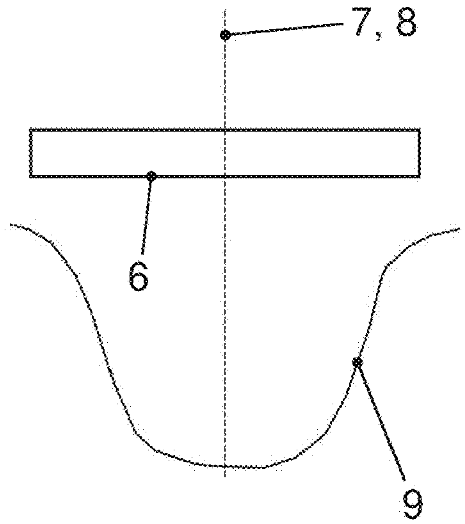
FIG. 8 shows a schematic top view of a lighting device according to the state of the art in the state installed in the motor vehicle, wherein the normal on the cover disk is parallel to the longitudinal direction of the vehicle.

The lighting device further comprises a first optical component **13*a* arranged in front of the first exit surface 13 of the light guide 11 and formed as a microstructured film and/or microstructured optical disk, and a second optical component arranged in front of the first optical component and formed as a microstructured film and/or microstructured optical disk. These optical components can, for example, substantially correspond to the micro-optical films 5 shown in FIG. 7**. At least the second optical component is optional and can also be omitted. The at least one optical component may have a structuring, not shown, which may contribute to the diffuseness and homogenization of the light emerging from the lighting device.

The lighting device further comprises a housing, not shown in FIG. 1 to FIG. 4, in which the light sources 10, the light guide 11 and the optical components such as the at least one microstructured film and/or the at least one microstructured optical disk can be at least partially accommodated. The housing can be embodied in two parts for simplified mounting of the optical components and have a rear and a front housing part. The light guide 11 and the optical components can then be positioned between these housing parts and held and fixed in place when the two housing parts are joined together. The housing parts can be latched together, screwed together from the rear or welded. In particular, the housing parts can substantially correspond to the housing parts **2*a*, 2*b* shown in FIG. 7**.

The rear housing part can have a rear wall that is at least partially reflective. Alternatively, a reflective optical component **13*b* can be provided, for example a reflective optical film that has a white surface to diffusely reflect the light back. The reflective optical component can be bent at the edges, so that both the second exit surface 14 of the light guide 11 and the lateral edges of the light guide 11 are covered in order to ideally reflect the escaping light back into the light guide 11. In particular, the reflective optical component can substantially correspond to the diffuse reflective film 4 shown in FIG. 7**.

The lighting device also comprises a cover disk 15, which is illuminated as homogeneously as possible by the light emitted from the light guide 11 (see FIG. 1 to FIG. 4). The cover disk 15 can serve as the illuminated exit surface of the lighting device. It is possible for the cover disk 15 to be formed as a two-component part in one piece with the front housing part.

During operation of the lighting device, light emitted by the light sources is coupled into the entry surface 12 of the light guide 11. From the first exit surface 13, part of the coupled light exits directly downwards in FIG. 1 and leaves the lighting device after passing through the optical components and the cover disk 15. Furthermore, some of the light propagating in the light guide 11 emerges from the second exit surface 14 of the light guide 11 and strikes the reflective optical component. The light is reflected back from this to the second exit surface 14, so that it at least partially re-enters the light guide 11 through the second exit surface 14 before it exits the first exit surface 13 and leaves the lighting device through the optical components and the cover disk 15.

Figure 5:
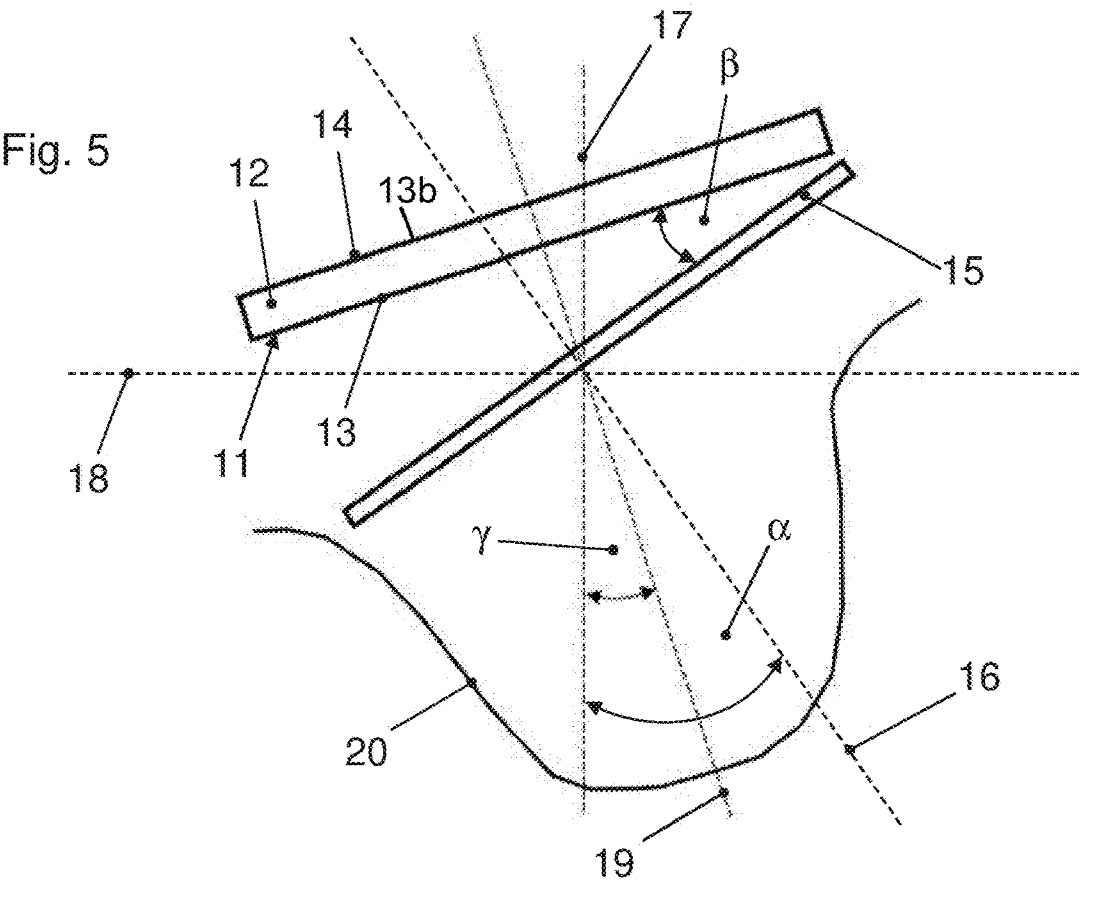
FIG. 5 shows a schematic top view of a lighting device according to the invention in the state in which it is installed in the motor vehicle, wherein the normal on the cover disk forms an angle not equal to 0° with the longitudinal direction of the vehicle.

The lighting device is designed to be installed in the motor vehicle in such a manner that the normal 16 of the cover disk 15 forms an angle $\alpha$ with the longitudinal direction of the vehicle 17, which in the illustrated embodiment example is approximately between 30° and 40° (see, for example, the schematic representation in FIG. 5). As a result, the cover disk 15 is inclined relatively strongly to the vehicle transverse direction 18 shown in FIG. 1 to FIG. 5.

At the same time, the light guide 11 is spaced at least in portions from the cover disk 15 and inclined relative to the cover disk 15. This means that the light guide 11 forms an angle $\beta$ with the cover disk 15 that is not equal to 0°, for example an angle $\beta$ between 10° and 20° (see FIG. 5). As a result, when installed in the motor vehicle, the normal 19 on at least portions of the exit surfaces 13, 14 of the light guide 11 forms an angle $\gamma$ with the longitudinal direction of the vehicle 17, which is smaller than the angle $\alpha$ between the normal 16 on the cover disk 15 and the longitudinal direction of the vehicle 17 (see FIG. 5). The at least one microstructured film and/or the at least one microstructured optical disk and the reflective surface are parallel to the exit surfaces 13, 14 of the light guide 11.

Figure 9:
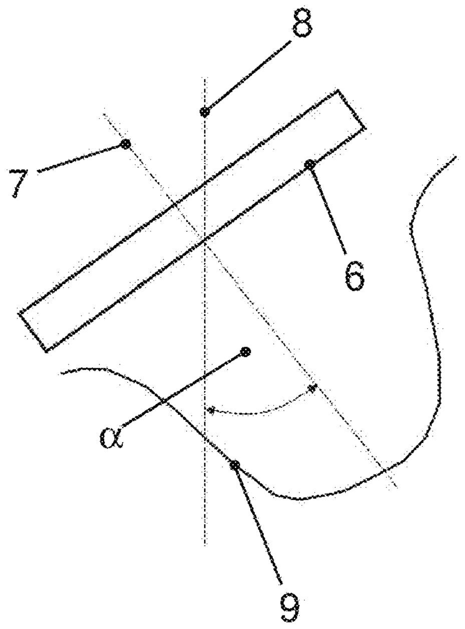
FIG. 9 shows a schematic top view of a lighting device according to the state of the art in the state installed in the motor vehicle, wherein the normal on the cover disk encloses an angle not equal to 0° with the longitudinal direction of the vehicle.

It can be seen from the light distribution 20 shown in FIG. 5 that the light intensity in the forward direction is comparatively high. In particular, the light intensity in the forward direction is significantly greater than in the embodiment according to the prior art shown schematically in FIG. 9 due to the light guide 11 being less inclined than the cover disk 15.

Another advantage of the spacing of cover disk 15 and light guide 11, at least in sections, is the additional usable space between light guide 11 and cover disk 15. This space can be used in particular to increase the size of the circuit board 10, which leads to a more favorable thermal situation and a lower thermal load on the light-emitting diodes. This action also helps to increase the performance of the lighting device.

Figure 2:
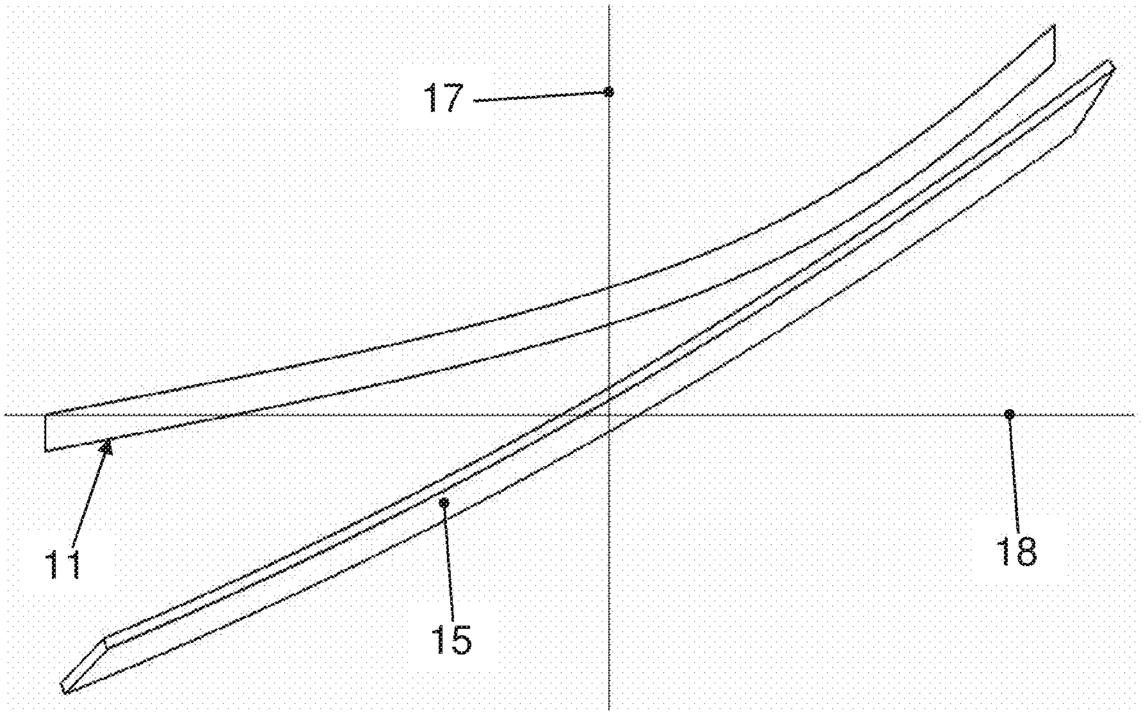
FIG. 2 shows a perspective view of the light guide and the cover disk of a second embodiment of a lighting device according to the invention.

FIG. 2 shows an embodiment in which the light guide 11 is curved in its longitudinal direction L, resulting in a curved geometry of the light guide 11. In this embodiment, the microstructured film and/or the at least one microstructured optical disk and the reflective surface are also formed parallel to the light guide 11 or are at least partially adjacent to the light guide 11.

Figure 3:
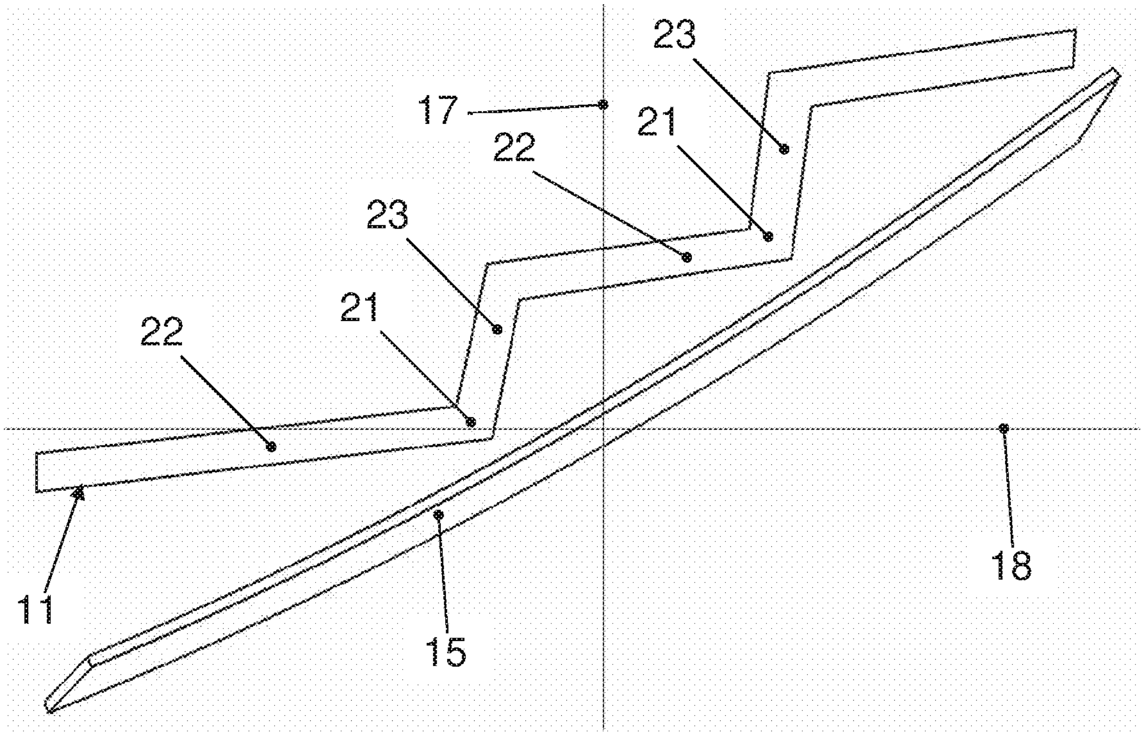
FIG. 3 shows a perspective view of the light guide and the cover disk of a third embodiment of a lighting device according to the invention.

FIG. 3 shows an embodiment in which the light guide 11 has steps 21 arranged side by side in its longitudinal direction L. This results in longer first portions 22 of the light guide 11 adjacent to the steps 21, which are inclined comparatively slightly to the transverse direction of the vehicle 18. Furthermore, there are shorter second portions 23 of the light guide 11 adjacent to the steps 21, which are inclined comparatively strongly to the transverse direction of the vehicle 18. In this embodiment, the light intensity in the forward direction is also comparatively high, because the first portions 22 of the light guide 11 extending almost parallel to the transverse direction 18 of the vehicle contribute disproportionately to the light distribution.

In this embodiment, the microstructured film and/or the at least one microstructured optical disk and the reflective surface are adapted to the shape of the light guide 11 in such a manner that they each extend in portions parallel to the light guide 11 or at least partially about the light guide 11.

Figure 4:
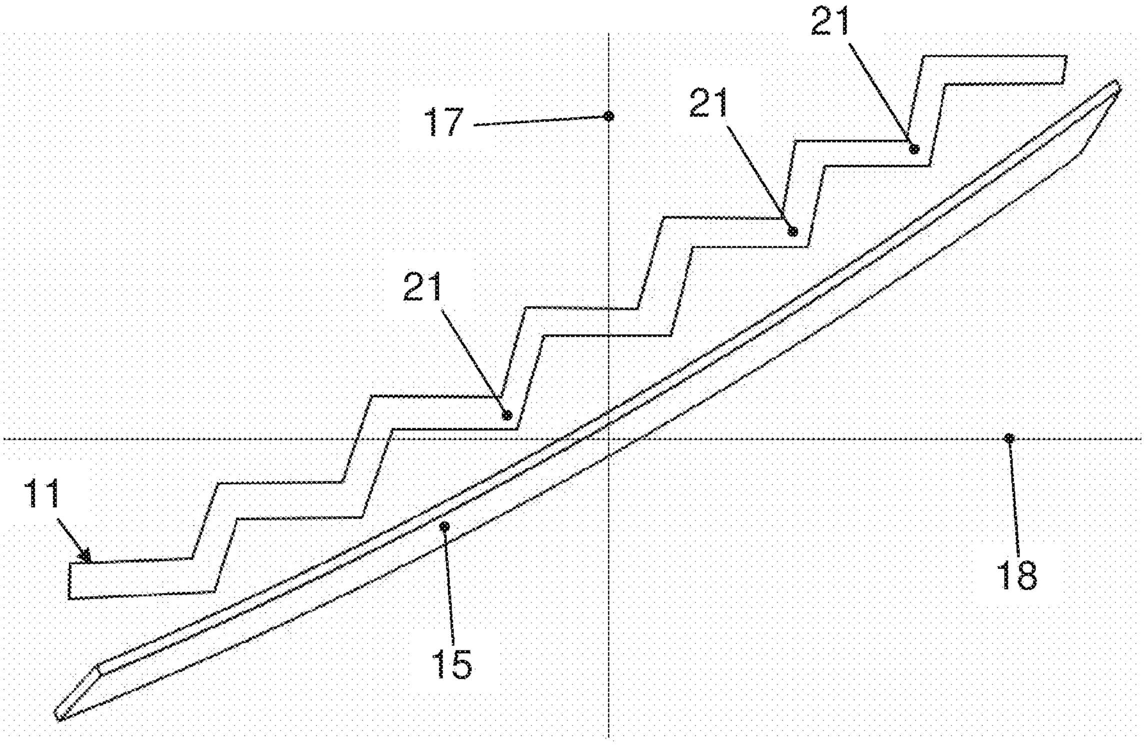
FIG. 4 shows a perspective view of the light guide and the cover disk of a fourth embodiment of a lighting device according to the invention.
Figure 6:
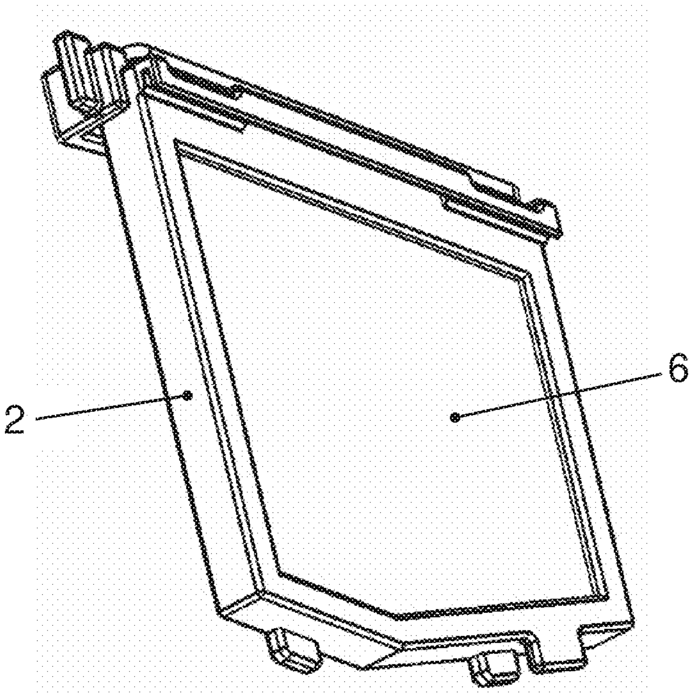
FIG. 6 shows a perspective view of a lighting device according to the state of the art.

The embodiment according to FIG. 4 differs from the embodiment according to FIG. 3 only in that a larger number of steps is provided, the distances between which are shorter in the longitudinal direction L of the light guide 11.

LIST OF REFERENCE NUMERALS

- 1 light source
- 2 housing
- 2*a*, 2*b* housing part
- 3 light guide
- 4 reflective film
- 5 micro-optics film
- 6 cover disk
- 7 normal of the cover disk
- 8 longitudinal direction of the vehicle
- 9 light distribution
- 10 circuit board
- 11 light guide
- 12 entry surface of the light guide
- 13 first exit surface of the light guide
- 13*a*, 13*b* optical component
- 14 second exit surface of the light guide
- 15 cover disk
- 16 normal of the cover disk
- 17 longitudinal direction of the vehicle
- 18 transverse direction of the vehicle
- 19 normal of the exit surface of the light guide
- 20 light distribution
- 21 step
- 22 first portion of the light guide
- 23 second portion of the light guide
- L longitudinal direction of the light guide
- T transverse direction of the light guide
- D depth of the light guide
- α angle between the normal of the cover disk and the longitudinal direction of the vehicle
- β angle between the light guide and the cover disk
- γ angle between the normal of the exit surface of the light guide and the longitudinal direction of the vehicle The above description is that of current embodiment of the invention. Various alterations and changes can be made without departing from the spirit and broader aspects of the invention. This disclosure is presented for illustrative purposes and should not be interpreted as an exhaustive description of all embodiments of the invention or to limit the scope of the claims to the specific elements illustrated or described in connection with these embodiments. Any reference to elements in the singular, for example, using the articles "a," "an," "the," or "said," is not to be construed as limiting the element to the singular.

The invention claimed is:

1. A lighting device for a motor vehicle, comprising:

a light source;

a light guide with an entry surface and an exit surface;

an optical component; and a cover disk;

wherein the lighting device is arranged such that light generated by the light source enters the light guide at least partially through the entry surface and exits from the exit surface, wherein light exiting from the exit surface of the light guide passes at least partially through the optical component and exits the lighting device through the cover disk;

wherein the lighting device is configured to be installed in the motor vehicle such that a normal of the cover disk forms a first non-zero angle (α) relative to a longitudinal direction of the motor vehicle, and the light guide is arranged in the lighting device such that the exit surface of the light guide encloses a second non-zero angle (β) with the cover disk, such that, when the lighting device is installed in the motor vehicle, a normal of the light guide forms a smaller angle (γ) relative to the longitudinal direction than the first non-zero angle (α); and wherein the lighting device is configured to be installed in the motor vehicle in such a manner that the first non-zero angle (α) is between 10° and 50°.

2. The lighting device of claim 1, wherein the cover disk is flat or curved, and wherein the exit surface of the light guide is flat or curved.

3. A lighting device for a motor vehicle, comprising:

a light source;

a light guide with an entry surface and an exit surface;

an optical component; and a cover disk;

wherein the lighting device is arranged such that light generated by the light source enters the light guide at least partially through the entry surface and exits from the exit surface, wherein light exiting from the exit surface of the light guide passes at least partially through the optical component and exits the lighting device through the cover disk;

wherein the lighting device is configured to be installed in the motor vehicle such that a normal of the cover disk forms a first non-zero angle (α) relative to a longitudinal direction of the motor vehicle, and the light guide is arranged in the lighting device such that the exit surface of the light guide encloses a second non-zero angle (β) with the cover disk, such that, when the lighting device is installed in the motor vehicle, a normal of the light guide forms a smaller angle (γ) relative to the longitudinal direction than the first non-zero angle (α); and wherein a radius of curvature of the exit surface of the light guide is different from a radius of curvature of the cover disk.

4. The lighting device of claim 1, wherein:

the light guide has a longitudinal direction and a transverse direction perpendicular thereto;

the light guide has a depth perpendicular to the longitudinal direction of the light guide and perpendicular to the transverse direction; and the light guide has two end surfaces, two narrow surfaces extending in the longitudinal direction of the light guide, and two wide surfaces extending in the longitudinal direction of the light guide.

5. The lighting device of claim 4, wherein the entry surface of the light guide is formed on one of the two narrow surfaces of the light guide, and wherein the exit surface of the light guide is formed on one of the two wide surfaces of the light guide.

6. The lighting device of claim 5, wherein the exit surface of the light guide is curved in the longitudinal direction of the light guide.

7. The lighting device of claim 6, wherein the exit surface of the light guide defines a radius of curvature, and wherein the radius of curvature changes in the longitudinal direction of the light guide.

8. The lighting device of claim 1, wherein the light guide has a plurality of steps.

9. The lighting device of claim 8, wherein the plurality of steps are spaced apart from one another in the longitudinal direction of the light guide.

10. The lighting device of claim 9, wherein first and second portions of the exit surface adjoining the plurality of steps are inclined with respect to one another, such that a normal of the first portion of the exit surface forms a smaller angle relative to the longitudinal direction of the motor vehicle than an angle formed between the second portion of the exit surface relative to the longitudinal direction of the motor vehicle.

11. A lighting device for a motor vehicle, comprising:

a light source;

a light guide with an entry surface and an exit surface;

an optical component; and a cover disk;

wherein the lighting device is arranged such that light generated by the light source enters the light guide at least partially through the entry surface and exits from the exit surface, wherein light exiting from the exit surface of the light guide passes at least partially through the optical component and exits the lighting device through the cover disk;

wherein the lighting device is configured to be installed in the motor vehicle such that a normal of the cover disk forms a first non-zero angle ($\alpha$) relative to a longitudinal direction of the motor vehicle, and the light guide is arranged in the lighting device such that the exit surface of the light guide encloses a second non-zero angle ($\beta$) with the cover disk, such that, when the lighting device is installed in the motor vehicle, a normal of the light guide forms a smaller angle ($\gamma$) relative to the longitudinal direction than the first non-zero angle ($\alpha$); and wherein the optical component is a microstructured film or a microstructured optical disk.

12. The lighting device of claim 1, wherein the optical component is configured as a reflecting surface, the reflecting surface being arranged on a side of the light guide facing away from the cover disk, wherein light emitted from a surface of the light guide facing away from the cover disk strikes the reflecting surface, is reflected by the reflecting surface, and re-enters the light guide.

13. The lighting device of claim 11, wherein the microstructured film or the microstructured optical disk are arranged in sections that are parallel to the exit surface of the light guide.

14. The lighting device of claim 1, wherein the light source comprises a plurality of light emitting diodes that are arranged on a circuit board next to one another in the longitudinal direction of the light guide.

* * * * *